(12) United States Patent
Simmerer et al.

(10) Patent No.: US 8,529,818 B2
(45) Date of Patent: Sep. 10, 2013

(54) AUTOMATED FIBER PLACEMENT IN FEMALE MOLD

(75) Inventors: Stefan Simmerer, Essen (DE); Michael John Brown, Columbia, SC (US); Stephen Bertram Johnson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 943 days.

(21) Appl. No.: 12/570,901

(22) Filed: Sep. 30, 2009

(65) Prior Publication Data

US 2011/0076442 A1   Mar. 31, 2011

(51) Int. Cl.
B29C 41/04   (2006.01)

(52) U.S. Cl.
USPC ............................ 264/311; 264/310; 264/312

(58) Field of Classification Search
USPC .......................................... 264/310, 311, 312
See application file for complete search history.

(56) References Cited

U.S. PATENT DOCUMENTS

| 3,788,916 | A | | 1/1974 | Gadelius | |
| 4,038,001 | A | | 7/1977 | Stinnes | |
| 4,611,980 | A | * | 9/1986 | Tsuji et al. | 425/435 |
| 5,482,584 | A | | 1/1996 | Herrmann et al. | |
| 6,773,655 | B1 | | 8/2004 | Tunis, III et al. | |
| 7,108,821 | B2 | * | 9/2006 | Tartar | 264/251 |
| 7,169,343 | B1 | | 1/2007 | Mills et al. | |
| 2004/0000734 | A1 | * | 1/2004 | Kapphan et al. | 264/29.1 |

FOREIGN PATENT DOCUMENTS

| EP | 1250991 B1 | 9/2005 |
| EP | 1310351 B1 | 4/2006 |
| WO | 2009052263 A1 | 4/2009 |

OTHER PUBLICATIONS

Molding Systems automate wind-turbine blade fabrication; website; Apr. 1, 2009; 1 page; www.news.thomasnet.com/fullstory/558462.
Mag Staff; New Systems Automate Composite wind turbine blade fabrication, double throughput and increase quality; Industry Newsletter; Apr. 29, 2009; 2 pages; www.windfair.net/press/6118.html.
Boeing 787 Dreamliner; website; Jun. 8, 2009; 5 pages; www.star-telegram.com/Multimedia/News/8june/080629Dreamliner/787dreamliner.smf.

* cited by examiner

Primary Examiner — Galen Hauth
(74) Attorney, Agent, or Firm — James McGinness; Armstrong Teasdale LLP

(57) ABSTRACT

A method and system for forming a product including a layer of fiber to a surface of a mold is provided. The system includes a mold and an apparatus. The mold is configured to rotate about an axis of rotation. An apparatus includes a base and a head coupled to the base. The base is configured to rotate about the axis of rotation. The head is configured to apply the fiber to the surface of the mold to form the product. The product includes at least one layer including at least one fiber applied using centrifugal force.

8 Claims, 5 Drawing Sheets

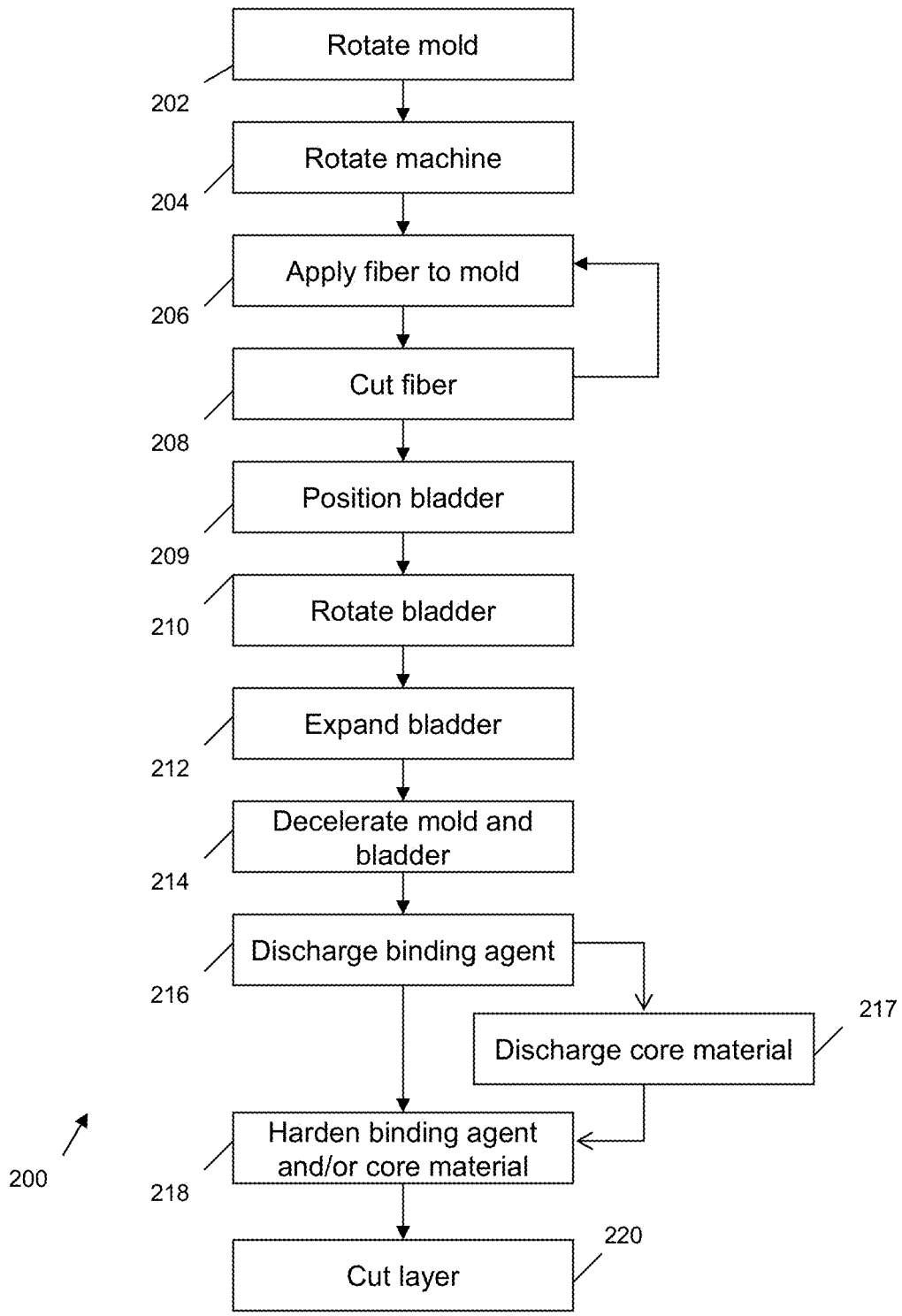

AUTOMATED FIBER PLACEMENT IN FEMALE MOLD

BACKGROUND OF THE INVENTION

The subject matter described herein relates generally to an automated fiber placement system and, more particularly, to methods and systems for automatically placing fiber within a female mold to fabricate a layer for a blade root section.

Wind turbines have been receiving increased attention for being environmentally safe and relatively inexpensive alternative energy sources. With the growing interest in alternative energy sources, considerable efforts have been made to develop wind turbines that are reliable and efficient. At least some known wind turbines include a rotor that transforms wind energy into a rotational torque that drives one or more generators.

At least some known rotors include a plurality of blade root sections. Some known systems fabricate blade root sections by rolling a sheet of fibers about a mandrel, positioning an outer surface of the mandrel against an inner surface of a mold, and mechanically pressing the sheet of rolled fibers against the inner surface of the mold. Other known systems fabricate blade root sections by unrolling the sheet of fibers against the inner surface of the mold.

BRIEF SUMMARY OF THE INVENTION

In one aspect, a method is provided for forming a product including a layer of fiber. The method includes rotating a mold having a surface about an axis of rotation, rotating an apparatus including a head about the axis of rotation, and applying the fiber to the surface of the mold using the head to form the product.

In another aspect, a system is provided for forming a product including a layer of fiber. The system includes a mold and an apparatus. The mold has a surface. The mold is configured to rotate about an axis of rotation. The apparatus includes a base and a head coupled to the base. The base is configured to rotate about the axis of rotation. The head is configured to apply the fiber to the surface of the mold to form the product.

In yet another aspect, a product is provided. The product is formed using a fiber placing system and a female mold including an inner surface. The product is formed on the inner surface. The product includes at least one layer comprising at least one fiber applied using centrifugal force.

BRIEF DESCRIPTION OF THE DRAWINGS

FIG. 5 is a flowchart of an exemplary method for automatically placing fiber within a female mold using the fiber placing system and the mold shown in FIG. 3.

DETAILED DESCRIPTION OF THE INVENTION

The methods and systems described herein relate generally to an automated fiber placing system including a fiber placing apparatus and a mold. The fiber placing apparatus and the mold are rotated to generate a centrifugal force. The fiber placing apparatus applies a fiber to an inner surface of the mold to form a layer, and the mold uses the centrifugal force to retain the layer on the inner surface. The layer is hardened using a suitable resin and is removed from the mold. The fiber placing system may be used to fabricate various fibrous components including wind turbine components such as, without limitation, a blade root section.

Figure 1:
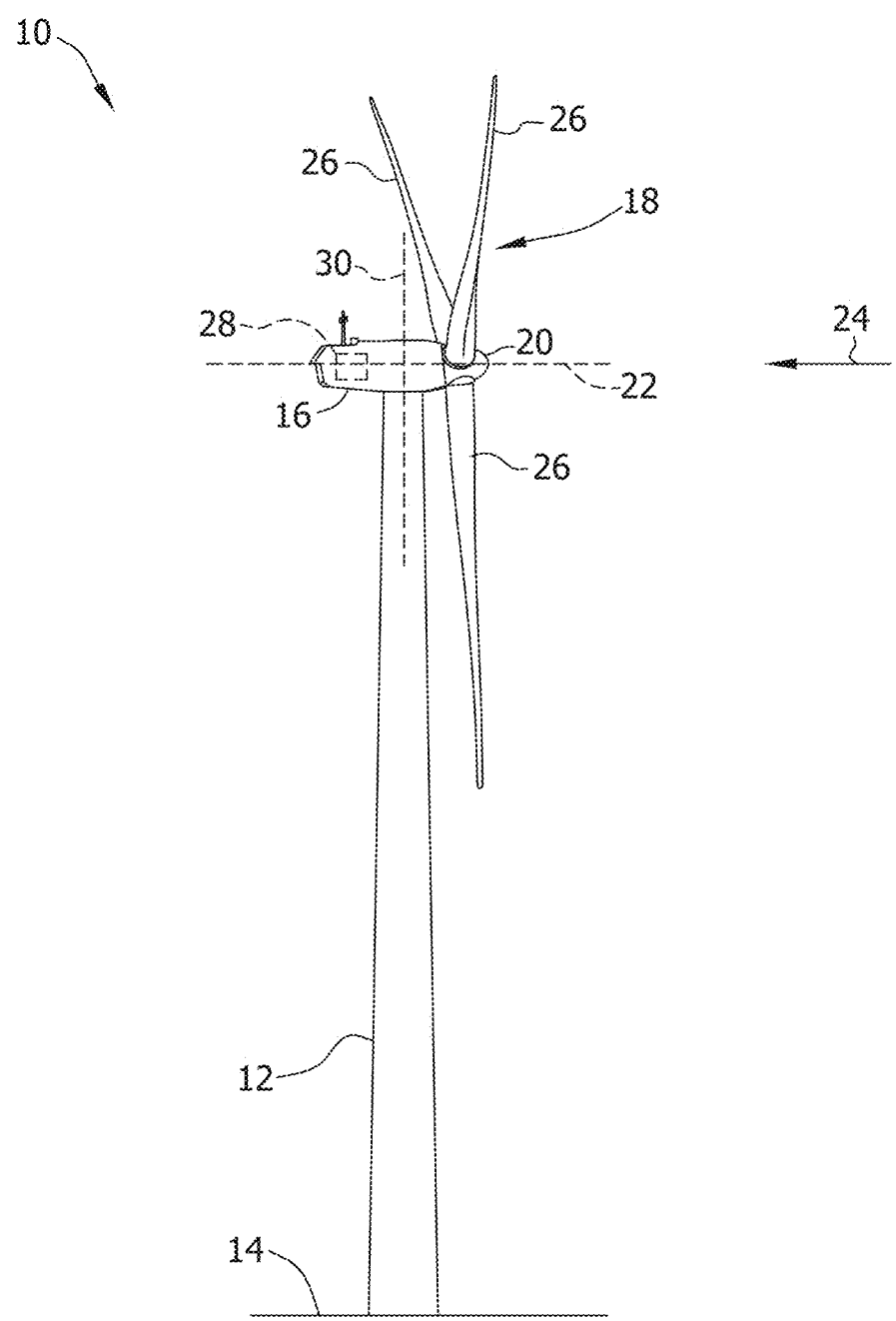
FIG. 1 is a perspective view of an exemplary wind turbine.

FIG. 1 is a perspective view of an exemplary wind turbine 10. As used herein, the term "wind turbine" is intended to be representative of any device that generates rotational energy from wind energy, and more specifically, converts kinetic energy of wind into mechanical energy. In the exemplary embodiment, wind turbine 10 is a wind turbine generator for generating electrical power from wind energy. As used herein, the term "wind turbine generator" is intended to be representative of any wind turbine that generates electrical power from rotational energy generated from wind energy, and more specifically, converts mechanical energy converted from kinetic energy of wind to electrical power.

In the exemplary embodiment, wind turbine 10 includes a tower 12 that extends from a supporting surface 14, and a nacelle 16 mounted on tower 12. Tower 12 may be any suitable type of tower and may be fabricated from any suitable material. In the exemplary embodiment, tower 12 is fabricated from tubular steel such that a cavity (not shown in FIG. 1) is defined between supporting surface 14 and nacelle 16. A height of tower 12 may be any suitable height enabling wind turbine 10 to function as described herein.

In the exemplary embodiment, a rotor 18 is coupled to nacelle 16 and includes a hub 20 rotatable about an axis of rotation 22. Wind turbine 10 and/or rotor 18 may be positioned at any angle with respect to a direction 24 of the wind to harness wind energy therefrom. In the exemplary embodiment, wind turbine 10 is a horizontal-axis wind turbine and rotor 18 generally faces upwind or downwind to harness wind energy.

In the exemplary embodiment, rotor 18 includes at least one rotor blade 26 coupled to and extending outwardly from hub 20. As used herein, the term "blade" is intended to be representative of any device that provides a reactive force when in motion relative to a surrounding fluid. In the exemplary embodiment, rotor blades 26 are spaced about hub 20 to facilitate rotating rotor 18 about axis of rotation 22 to enable kinetic energy to be transferred from the wind into usable mechanical energy, and subsequently, electrical energy. Loads induced to rotor blades 26 are transferred to hub 20.

In the exemplary embodiment, a control system 28 is communicatively coupled to a plurality of the components of wind turbine 10 for generally monitoring and controlling operation of wind turbine 10 and/or some or all of the components thereof. For example, in the exemplary embodiment, as direction 24 changes, a yaw direction of nacelle 16 may be controlled about a yaw axis 30 to position rotor blades 26 with respect to direction 24. Moreover, control system 28 may be used to monitor and control the overall system including, without limitation, pitch and speed regulation, high-speed shaft and yaw brake application, yaw and pump motor application, and/or fault monitoring. Alternative distributed or centralized control architectures may be used in certain embodiments.

Figure 2:
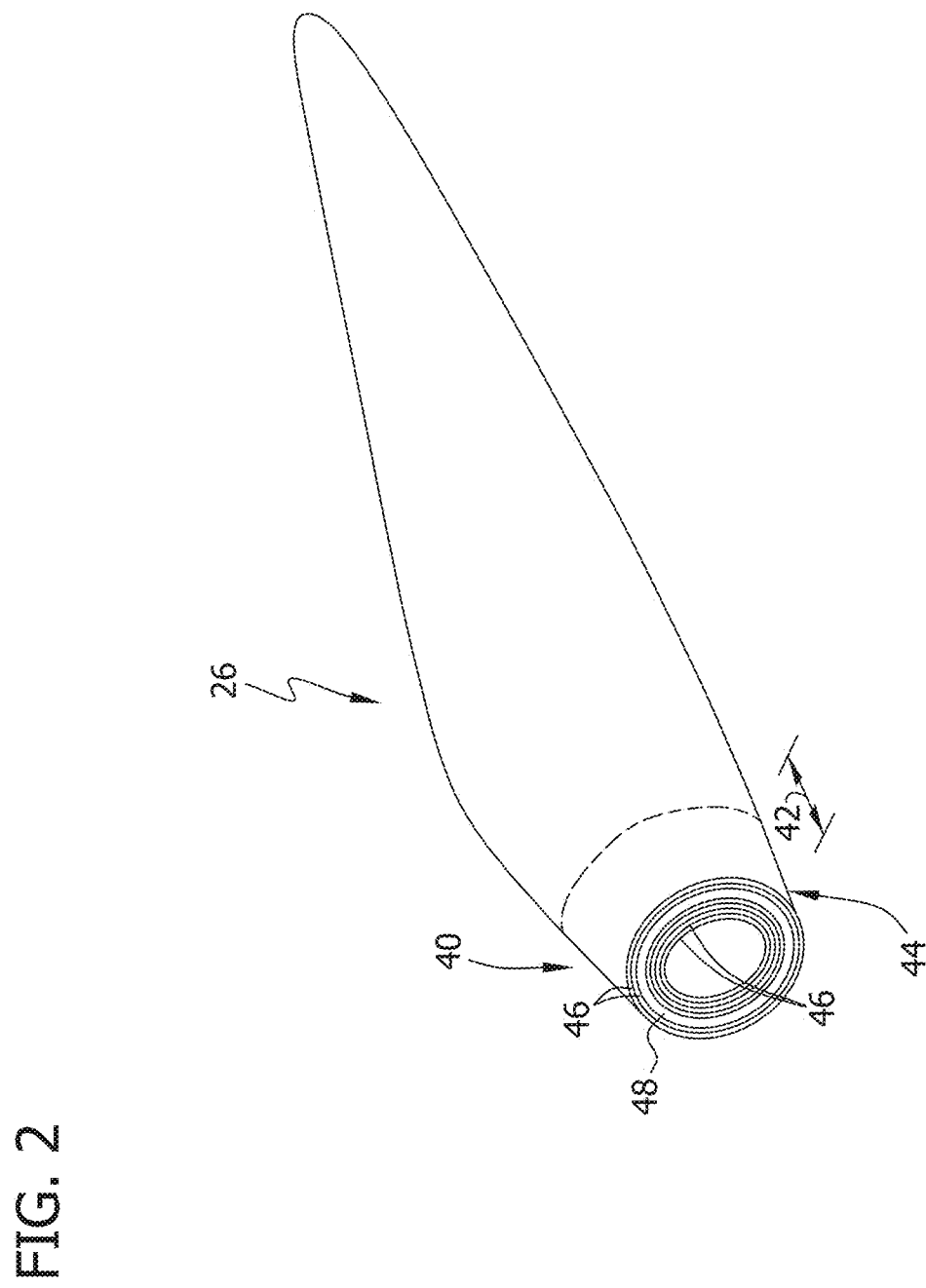
FIG. 2 is a perspective view of an exemplary rotor blade suitable for use with the wind turbine shown in FIG. 1.

FIG. 2 is a perspective view of rotor blade 26 suitable for use with wind turbine 10. Rotor blade 26 includes a blade root section 40 spanning a length 42 of rotor blade 26. Blade root section 40 includes a composite shell 44 having any suitable number of layers 46 and/or core materials 48. Layer 46 and/or core material 48 spans a suitable length of blade root section 40. In the exemplary embodiment, a section spanning about 1500 mm at one end of blade root section 40 does not include core material 48. In the exemplary embodiment, layers 46 and core material 48 are laminated together using any suitable resin including, without limitation, one or more of an epoxy, a vinylester, and a polyester resin.

In the exemplary embodiment, layers 46 and core material 48 facilitate strengthening composite shell 44 to reduce and/or eliminate damage to blade root section 40 from torque of rotor 18 and/or buckling due to wind loads acting on rotor blades 26. Layers 46 and core material 48 have any suitable thickness to support and/or strengthen blade root section 40. In the exemplary embodiment, one core material 48 having a thickness that is greater than a thickness of layer 46 is positioned between two adjacent layers 46.

Each layer 46 may include any suitable number of sub-layers made of any suitable material including, without limitation, one or more of a metal, a plastic, a wood, and a fiber material. Core material 48 may include any suitable material including, without limitation, one or more of a balsa wood, a polyvinyl chloride (PVC) foam, a styrene acryl nitrate (SAN) foam, a polyethylene (PE) foam, a polyurethane (PU) foam, a polyethylene terephthalate (PET) foam, a metal honeycomb, and a fabric material.

Figure 3:
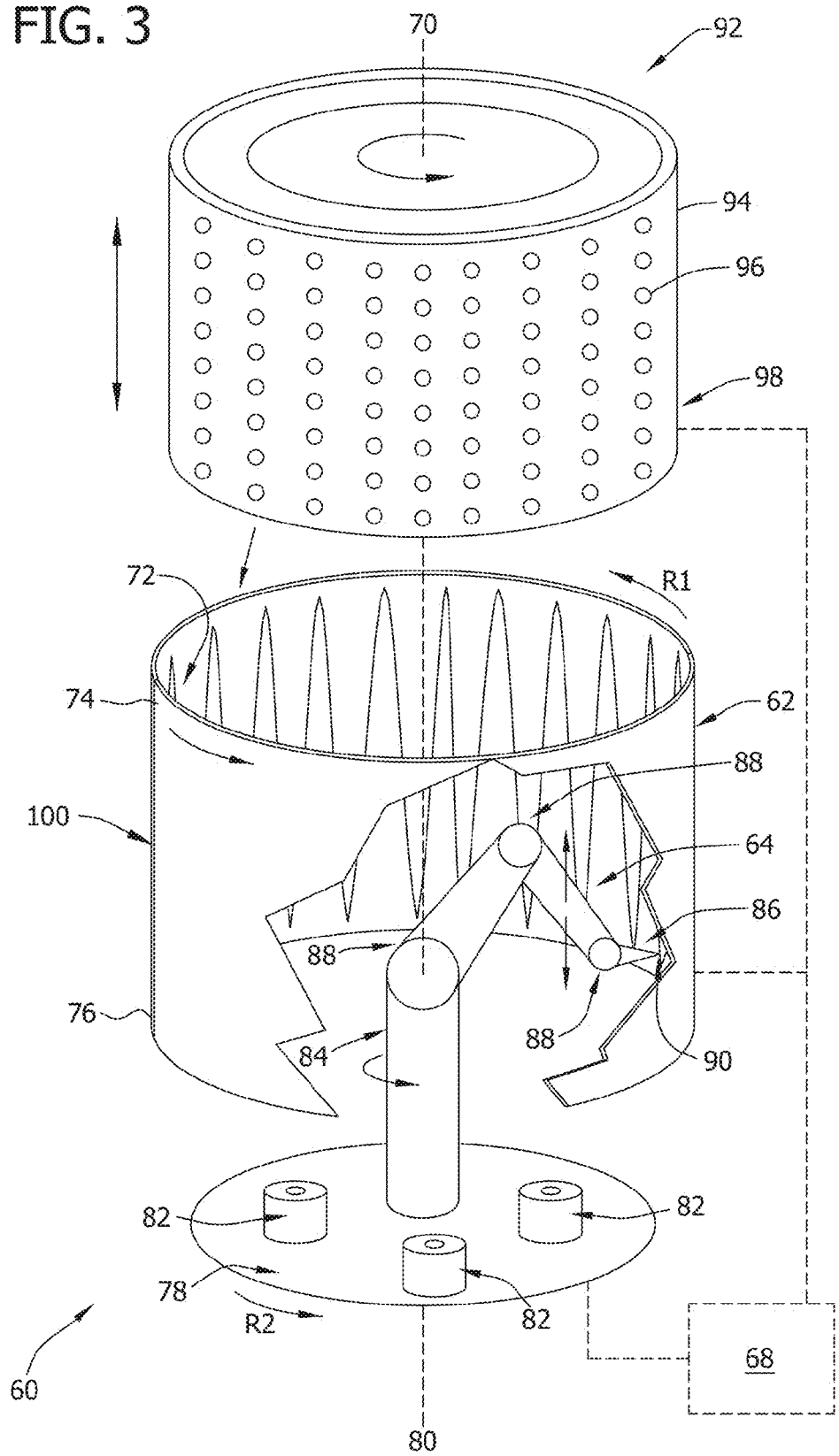
FIG. 3 is a broken-away exploded perspective view of an exemplary fiber placing system and an exemplary mold suitable for use with the fiber placing system.
Figure 4:
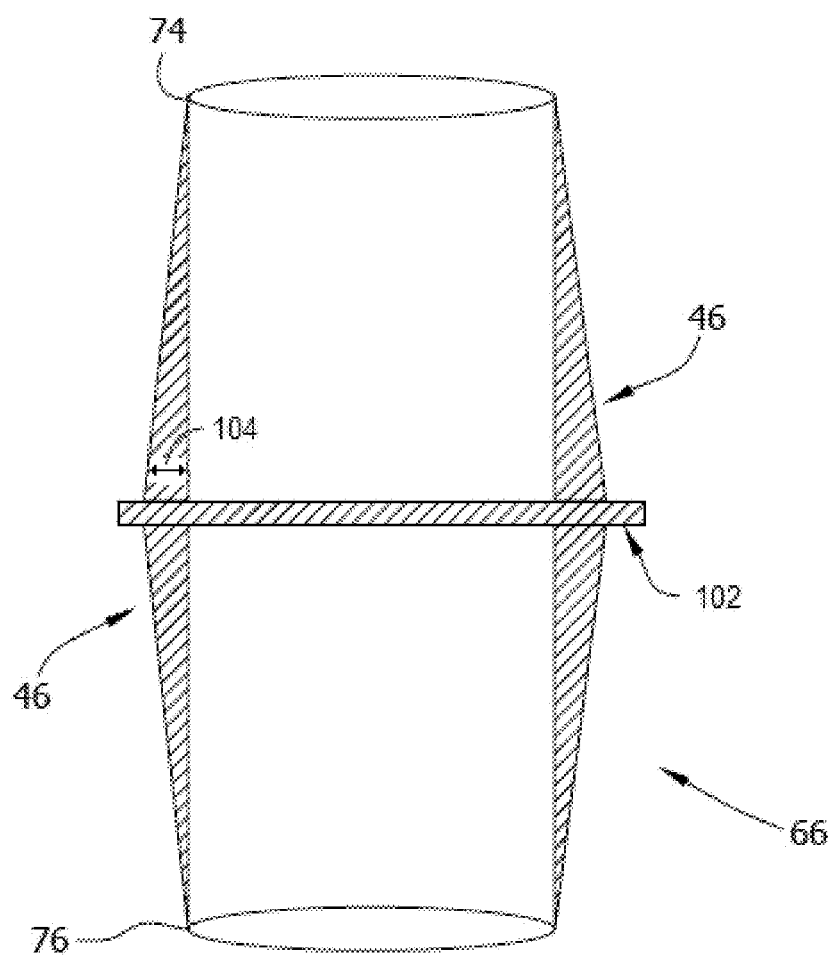
FIG. 4 is a cross-sectional view of a product fabricated by the fiber placing system and the mold shown in FIG. 3.

FIG. 3 is a broken-away exploded perspective view of a fiber placing system 60 including a mold 62 and a fiber placing apparatus 64. FIG. 4 is a cross-sectional view of a product 66 fabricated by fiber placing system 60. More specifically, product 66 includes coupled layers 46 for blade root sections 40. Fiber placing apparatus 64 is configured to release a fiber that is retained against mold 62 using centrifugal force. In the exemplary embodiment, at least one controller 68 is configured to control operation of fiber placing system 60.

Controller 68 includes a processor configured to perform the methods and/or steps described herein. As used herein, the term "processor" broadly refers to a controller, a microcontroller, a microcomputer, a programmable logic controller (PLC), an application specific integrated circuit, and other programmable circuits, and these terms are used interchangeably herein.

It should be understood that a processor and/or control system can also include memory, input channels, and/or output channels. In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and/or a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, automated fiber placement system control commands. The execution of sequences of instructions is not limited to any specific combination of hardware circuitry and software instructions.

Mold 62 is configured to rotate about a first axis of rotation 70. In the exemplary embodiment, mold 62 includes an inner surface 72, a first end 74, and a second end 76 opposing first end 74. Mold 62 has a shape suitable to form product 66. In the exemplary embodiment, mold 62 is substantially cylindrical. Alternatively, mold 62 may be any suitable shape to form product 66, layer 46, and/or blade root section 40.

Apparatus 64 includes a base 78 configured to rotate about a second axis of rotation 80. Base 78 is configured to receive at least one spool 82 and/or roving bundle. In the exemplary embodiment, base 78 receives three spools 82. Each spool 82 provides at least one fiber of any suitable type to an arm 84 coupled to base 78. Arm 84 is configured to rotate about second axis of rotation 80 with base 78 to reduce a probability of tangling the fiber spanning from spool 82 to arm 84.

In the exemplary embodiment, a head 86 is coupled to arm 84. In the exemplary embodiment, arm 84 includes a plurality of joints 88 that enables head 86 to move in at least one direction. More specifically, in the exemplary embodiment, arm 84 is pivotable and/or rotatable at each joint 88 to move head 86 in any suitable direction with respect to mold 62 and/or apparatus 64. Arm 84 may be used as a linear guiding system.

In the exemplary embodiment, fiber placing system 60 includes a cutting device 90 configured to cut at least one of the fiber, layer 46, and/or product 66. More specifically, in the exemplary embodiment, cutting device 90 is positioned at head 86 and is configured to cut the fiber from spool 82.

In the exemplary embodiment, fiber placing system 60 includes a bladder 92 configured to contract and expand. In the exemplary embodiment, bladder 92 is substantially cylindrically shaped to be positioned within mold 62 and around apparatus 64 about axis of rotation 80. In the exemplary embodiment, bladder 92 includes a vacuum bag system 94 defining a plurality of openings 96. Vacuum bag system 94 is configured to discharge a binding agent through openings 96 and onto inner surface 72 of mold 62 and/or the fibers applied to inner surface 72 of mold 62. In the exemplary embodiment, bladder 92 includes a heating device 98 configured to provide heat to the binding agent to facilitate curing and/or hardening the binding agent.

Mold 62 includes at least one split line 100 to facilitate removing product 66 from mold 62. In the exemplary embodiment, mold 62 includes two split lines 100 that divide mold 62 into two sections. Additionally or alternatively, mold 62 has a shape suitable to remove product 66. For example, mold 62 may have a conical shape. Additionally, differential heating and/or cooling between mold 62 and product 66 may be used to separate mold 62 from product 66.

FIG. 5 is a flowchart of an exemplary method 200 for automatically placing fiber within a female mold. During use, in the exemplary embodiment, mold 62 rotates 202 about first axis of rotation 70 at a first rate of rotation R1, and apparatus 64 rotates 204 about second axis of rotation 80 at a second rate of rotation R2. First rate of rotation R1 and second rate of rotation R2 facilitate compressing the fibers to produce a suitable fiber-to-weight ratio. The first rate of rotation R1 is a speed suitable to retain the fiber against the inner surface of mold 62 such that product 66 is compressed to provide a suitable density of fiber. The second rate of rotation R2 is a speed suitable to release the fiber with such that the fiber is suitably straight when released. In the exemplary embodiment, first rate of rotation R1 and second rate of rotation R2 are between about 1.5 Hertz (Hz) (90 revolutions per minute (RPM)) and 3 Hz (216 RPM), resulting in a g-force of about 10 G (98 m/s$^2$) to 40 G (392 m/s$^2$). In the exemplary embodiment, first axis of rotation 70 is co-axially aligned with second axis of rotation 80. Alternatively, first axis of rotation 70 is not aligned with second axis of rotation 80.

Each spool 82 provides a fiber to apparatus 64 and, more specifically, to head 86 via arm 84. In the exemplary embodiment, apparatus 64 applies 206 the fiber from spool 82 to inner surface 72 to form product 66. As such, an outer surface of product 66 is substantially complementary to inner surface 72. In the exemplary embodiment, product 66 includes layers 46 coupled at a longitudinal midsection 102 between first end 74 and second end 76 (see FIG. 4).

Mold 62 rotates about first axis of rotation 70 at first rate of rotation R1 to provide a centrifugal force sufficient to retain product 66 against inner surface 72. Base 78, spool 82, arm 84, and head 86 all rotate about second axis of rotation 80 at second rate of rotation R2 to reduce a probability of tangling the fiber.

In the exemplary embodiment, movement of head 86 and a relative rotation of mold 62 and apparatus 64 determine fiber orientation. More specifically, in the exemplary embodiment, movement of head 86 and first and second rates of rotation R1 and R2 may be configured to apply fiber in any suitable pattern. Moreover, movement of head 86 and first and second rates of rotation R1 and R2 may be configured to apply fiber to produce various fiber densities.

Head 86 moves longitudinally between first end 74 and second end 76 to account for a longitudinal, or vertical, component for the application 206 of the fiber. Fiber placing system 60 may be configured to apply the fiber using any suitable pattern. For example, fiber placing system 60 may produce product 66 using a winding pattern. In the exemplary embodiment, head 86 is movable via a movement of arm 84 at joints 88.

In the exemplary embodiment, cutting device 90 cuts 208 the fiber after each pass and/or when head 86 is at first end 74 or second end 76. As used herein, the term "pass" is intended to be representative of a movement of head 86 from first end 74 to second end 76, second end 76 to first end 74, and/or any portion thereof to facilitate fabricating various densities and thicknesses of product 66. Cutting 208 the fiber facilitates applying 206 the fiber in substantially even strands, reducing a potential for folds of the fiber and/or uneven surfaces of product 66. Moreover, cutting 208 the fiber at first end 74 and second end 76 facilitates reducing an amount and/or weight of the fiber being used to form product 66. In the exemplary embodiment, fiber placing system 60 applies a continuous fiber for each pass.

A difference between first rate of rotation R1 and second rate of rotation R2 provides a relative movement between mold 62 and apparatus 64 and accounts for a tangential, or horizontal, component for the application 206 of the fiber. In the exemplary embodiment, first rate of rotation R1 and second rate of rotation R2 are adjustable to account for an adjustment of the tangential component for the application 206 of the fiber. More specifically, in the exemplary embodiment, where first rate of rotation R1 is greater than second rate of rotation R2, the fiber is applied in a first horizontal direction, and wherein first rate of rotation R1 is less than second rate of rotation R2, the fiber is applied in a second horizontal direction that is opposite the first horizontal direction.

In the exemplary embodiment, product 66 includes a plurality of layers of fiber. In the exemplary embodiment, each layer includes at least one fiber applied by apparatus 64 using centrifugal force. In the exemplary embodiment, each layer is retained against an inner surface of mold 62. In the exemplary embodiment, at least one of the fibers is a continuous fiber extending from first end 74 to second end 76 of product 66. In the exemplary embodiment, at least one of the fibers is oriented parallel to the longitudinal axis by rotating mold 62 and apparatus 64 at a substantially similar rate of rotation. In the exemplary embodiment, at least one of the fibers is oriented along at least a part of a circumference of the inner surface of mold 62 by maintaining head 86 in a position and rotating mold 62 and apparatus 64 at different rates of rotation.

In the exemplary embodiment, bladder 92 is positioned 209 within mold 62 about first axis of rotation 70. Bladder 92 is rotated 210 about first axis of rotation 70 at first rate of rotation R1 such that a relative movement between mold 62 and bladder 92 is reduced. Bladder 92 is expanded 212 such that an outer surface of bladder 92 provides a force sufficient to retain product 66 against inner surface 72 of mold 62.

Mold 62 and bladder 92 each decelerate 214 at a substantially similar rate, and, as the rate of rotation and, thus, the centrifugal force decrease, bladder 92 retains product 66 against inner surface 72. In the exemplary embodiment, mold 62 and bladder 92 decelerate 214 from first rate of rotation R1 to a third rate of rotation R3 that is substantially zero Hz (0 RPM). From first rate of rotation R1 to third rate of rotation R3, mold 62 and bladder 92 both rotate about first axis of rotation 70 at a substantially similar rate to reduce a relative rotation between mold 62 and bladder 92 and, thus, reduce a probability of shifting product 66.

In the exemplary embodiment, vacuum bag system 94 discharges 216 a binding agent through openings 96 onto inner surface 72 and/or product 66, which facilitates forming and maintaining product 66 into a shape of mold 62. Additionally or alternatively, the fiber may be impregnated or coated with the binding agent prior to application 206 of the fiber. In the exemplary embodiment, the binding agent is a suitable resin, such as, but not limited to, an epoxy, a vinylester, and/or a polyester resin. Moreover, vacuum bag system 94 may discharge 217 at least one core material 48 onto product 66 between each layer 46. In the exemplary embodiment, core material 48 is at least one of a PVC foam, a SAN foam, a PE foam, a PU foam, and a PET foam.

In the exemplary embodiment, heating device 98 facilitates curing and/or hardening 218 the binding agent and/or core material 48. Alternatively, binding agent may be hardened 218 at any suitable temperature using any suitable pressure for any suitable amount of time. In the exemplary embodiment, product 66 is removed from mold 62 after the binding agent hardens 218.

In the exemplary embodiment, a thickness 104 of product 66 is variable such that thickness 104 is symmetrical about midsection 102 of product 66. More specifically, in the exemplary embodiment, thickness 104 increases moving toward midsection 102 from either first end 74 or second end 76 such that thickness 104 is approximately 100 mm at midsection 102 and is approximately 0 mm at both first end 74 and second end 76. Alternatively, thickness 104 may be any thickness suitable to fit blade root section 40.

In the exemplary embodiment, cutting device 90 cross-sectionally cuts 220 product 66 at midsection 102 to decouple two layers 46. In the exemplary embodiment, layers 46 are substantially similar in shape and size. Alternatively, the shape and size of layers 46 may be any shape and/or size suitable for use with blade root section 40.

Although the methods described and/or illustrated herein are described and/or illustrated herein with respect to automatically placing fiber within a female mold, the methods described and/or illustrated herein are not limited to forming a wind turbine blade component such as a blade root. Rather, the methods described and/or illustrated are applicable to forming any suitable apparatus or component.

Exemplary embodiments of the fiber placement system and methods for automatically placing fiber are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with wind turbines as described herein. Rather, the present invention can be implemented and utilized in connection with many other industries.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for forming a product including a layer of fiber, the method comprising:
    rotating a mold having a surface about an axis of rotation, the rotation providing a centrifugal force;
    rotating an apparatus including a head about the axis of rotation;
    applying the fiber to the surface of the mold using the head to form the product, wherein the head moves between a first end of the mold and a second end of the mold, the centrifugal force facilitating retaining the fiber against the mold; and,
    cutting the fiber when the head is at the first end and the second end.

2. A method in accordance with claim 1, further comprising:
    positioning at least one spool on a base of the apparatus, the spool configured to provide the fiber to the head; and,
    rotating the base about the axis of rotation.

3. A method in accordance with claim 1, further comprising:
    positioning a bladder about the axis of rotation; and,
    expanding the bladder to retain the product against the surface of the mold.

4. A method in accordance with claim 3, further comprising:
    positioning a vacuum bag system defining a plurality of openings; and,
    discharging a binding agent through the plurality of openings onto at least one of the product and the surface of the mold.

5. A method in accordance with claim 1, wherein the mold is rotated at a first rate of rotation and the apparatus is rotated at a second rate of rotation different than the first rate of rotation.

6. A method in accordance with claim 1, wherein applying the fiber further comprises applying the fiber such that the product has a variable thickness.

7. A method for forming a product including a layer of fiber, the method comprising:
    rotating a mold having a surface about an axis of rotation, the rotation providing a centrifugal force;
    rotating an apparatus including a head about the axis of rotation;
    applying the fiber to the surface of the mold using the head to form the product, the centrifugal force facilitating retaining the fiber against the mold;
    positioning a bladder about the axis of rotation; and,
    expanding the bladder to retain the product against the surface of the mold.

8. A method for forming a product including a layer of fiber, the method comprising:
    rotating a mold having a surface about an axis of rotation at a first rate of rotation, the rotation providing a centrifugal force;
    rotating an apparatus including a head about the axis of rotation at a second rate of rotation different than the first rate of rotation; and,
    applying the fiber to the surface of the mold using the head to form the product, the centrifugal force facilitating retaining the fiber against the mold.

* * * * *